United States Patent [19]

Geissler

[11] Patent Number: 5,343,023
[45] Date of Patent: Aug. 30, 1994

[54] INDUCTION HEATER HAVING A POWER INVERTER AND A VARIABLE FREQUENCY OUTPUT INVERTER

[75] Inventor: Steven J. Geissler, Appleton, Wis.

[73] Assignee: Miller Electric Mfg. Co., Appleton, Wis.

[21] Appl. No.: 749,048

[22] Filed: Aug. 23, 1991

[51] Int. Cl.$^5$ .............................................. H05B 6/08
[52] U.S. Cl. .................................. 219/661; 219/663; 219/665; 363/71
[58] Field of Search ................... 219/10.77, 10.75, 660, 219/611, 663, 669, 665, 667; 363/71, 72

[56]  References Cited

U.S. PATENT DOCUMENTS

| | | | |
|---|---|---|---|
| Re. 33,467 | 12/1990 | Steck et al. | 219/10.79 X |
| 3,466,528 | 9/1969 | Adams | 219/10.75 X |
| 3,823,362 | 7/1974 | Bailey | 219/10.77 X |
| 3,953,700 | 4/1976 | Sindt | 219/10.79 |
| 4,112,286 | 9/1978 | Alderman et al. | 219/10.77 |
| 4,120,712 | 10/1978 | Sindt | 219/10.53 |
| 4,293,363 | 10/1981 | Wakabayashi et al. | 219/10.41 |
| 4,382,275 | 5/1983 | Glennon | 363/72 |
| 4,578,553 | 3/1986 | Yamashita et al. | 219/10.77 |
| 4,602,139 | 7/1986 | Hutton et al. | 219/10.43 |
| 4,637,199 | 1/1987 | Steck et al. | 219/10.75 X |
| 4,650,947 | 3/1987 | Hutton et al. | 219/10.41 |
| 4,654,495 | 3/1987 | Hutton et al. | 219/10.41 |
| 4,677,535 | 6/1987 | Kawabata et al. | 363/71 |
| 4,847,746 | 7/1989 | Rilly et al. | 363/132 |
| 4,853,832 | 8/1989 | Stuart | 363/71 X |
| 4,950,348 | 8/1990 | Larsen | 219/10.43 X |
| 5,031,088 | 7/1991 | Tanaka | 363/71 |

OTHER PUBLICATIONS

Olofstrom Induction Heating Station, Volvo Car Corporation, Olofstrom Plants, Sweden 1987.
Induction Accelerated Cure of Structural Adhesives, J. Buser and L. Brzozowski, (no date).
Wel-Bond Induction Adhesive Bondign Systems & Development, Member of the Welduction Group, Livonia, Michigan (no date).
Induction Adhesive Bonding The Futrue Fast Cure, D. J. Williams, Wel-Bond Inc., Livonia, Michigan (no date).
Adhesives in Automaking, J. Colemen, Editor, Assembly Engineering, A Hitchcock Publication, Mar. 1988.
Induction Heating, Robotron Corporation, Southfield, Michigan (no date).
Elva, The New Generation of Induction Heaters, Reklam Center, Sweden, 1988.

Primary Examiner—Philip H. Leung
Attorney, Agent, or Firm—Foley & Lardner

[57] ABSTRACT

An induction heater comprises a coupled pair of inverters and an induction head for generating heat, coupled to the second inverter. The first inverter operates at a constant frequency, but the total output current is controlled through pulse width modulation. The output current is rectified and provided as a DC input voltage, proportional to the total output current of the first inverter, to the second inverter. The second inverter operates at an adjustable frequency which is selected by the user to optimize heating. The power delivered to the induction heater is dependent on the output voltage of the second inverter, which is dependent on the input voltage to the second inverter, and the output current of the first inverter.

32 Claims, 3 Drawing Sheets

INDUCTION HEATER HAVING A POWER INVERTER AND A VARIABLE FREQUENCY OUTPUT INVERTER

BACKGROUND OF THE INVENTION

1. Technical Field

The present invention relates generally to induction heaters and, in particular, to induction heaters having inverter power supplies.

2. Background Art

Induction heating is a well known method for producing heat in a localized area on a susceptible metal object. Induction heating involves applying a high frequency AC electric signal to a heating loop placed near a specific location on a piece of metal to be heated. The varying current in the loop creates a varying magnetic flux within the metal to be heated. Current is induced in the metal by the magnetic flux and the internal resistance of the metal causes it to heat up in a relatively short period of time. Induction heaters may be used for many different purposes including hardening of metals, brazing, soldering, and other fabrication processes in which heat is a necessary or desirable agent or adjurant.

The prior art is replete with induction heaters, many of which have inverter power supplies. Such inverter power supplies typically develop high frequency signals, generally in the tens of kilohertz range, for application to the work coil. Because there is generally a frequency at which heating is most efficient, some prior art inverter power supplies operate at a frequency selected to optimize heating. Also, because heat intensity is dependent on the magnetic flux created, some prior art induction heaters control the total current provided to the heating coil, thereby controlling the magnetic flux and the heat produced.

One example of the prior art representative of induction heaters having inverters is U.S. Pat. No. 4,092,509, issued May 30, 1978, to Mitchell. Mitchell discloses numerous inverter circuits for powering induction heaters. The circuits are designed to operate in the twenty to fifty kilohertz range, allegedly to maximize induction heating efficiency. To the extent Mitchell discloses controlling the magnitude of the magnetic flux, and therefore controlling the heat created by the induction heater, switches are used to select between one of two inverter circuits. For example, in FIG. 40, switches 404 and 407 are moved to positions 404A and 407A, respectively, or to positions 404B and 407B, respectively, to select between high power output and low power output.

Another known induction heater utilizing an inverter power supply is described in U.S. Pat. No. 3,816,690, issued Jun. 11, 1974, to Mittelmann. Mittelmann describes an induction heater having a variable frequency inverter power supply. The frequency of operation of the inverter is said to be selected to provide the maximum efficiency of energy transfer between the output transformer of the inverter and the inductance element used to heat the workpiece. In order to provide the proper amount of heat to the workpiece, Mittelmann monitors the watt-seconds delivered to the output of the inverter. In response to the measured watt-seconds, Mittelmann selectively turns the inverter on and off. Thus, the average heat delivered by the induction heater is controlled.

Another type of induction heater in which the output is controlled by turning an inverter power supply on and off is disclosed in the U.S. Pat. No. 3,475,674, issued Oct. 28, 1969, to Porterfield, et al. The average output power of the induction heater described by Porterfield varies in accordance with the ratio of the time during which the inverter is off compared to the time during which the inverter is on.

Each of the above methods to control power delivered to an induction heater either is not adjustable in frequency and/or does not control the peak heat delivered by the heater. Accordingly, it is desirable to have an induction heater utilizing an inverter which provides a broad range of frequencies as well as a broad range of peak output heat. The output heat should be controllable independent of frequency and should control the peak as well as the average heat power.

SUMMARY OF THE INVENTION

In one preferred embodiment of the present invention, an induction heater comprises a coupled pair of inverters in which the first inverter is coupled to the second inverter by a first coupling circuit. An induction head for generating heat is coupled to the second inverter by a second coupling circuit.

In another preferred embodiment, an induction heater comprises a phase modulated inverter, for inverting and phase modulating a DC signal, operable at a first frequency coupled to an adjustable frequency inverter. The adjustable frequency inverter provides an output signal having a magnitude responsive to the magnitude phase modulation of the phase modulated inverter. An induction head is coupled to the adjustable frequency inverter and a controller is connected to the phase modulated inverter, for providing a feedback signal indicative of the heat output of the induction head and for controlling the phase modulation of the phase modulated inverter in response to the feedback signal.

In yet another preferred embodiment of the invention, an induction heater comprises a first inverter for receiving a first DC signal and providing a first modulated AC signal and a second inverter for receiving a second DC signal and providing a second AC signal at an adjustable frequency, wherein the magnitude of the second AC signal is responsive to the magnitude of the second DC signal. A first coupler is connected to the first inverter and to the second inverter, and receives the first AC signal and converts it to the second DC signal. The magnitude of the second DC signal is responsive to the modulation of the first AC signal. An induction head is coupled to the second inverter and receives a third AC signal and having a magnitude responsive to a magnitude of the second AC signal.

In still a further preferred embodiment of the invention, a method of induction heating comprises the steps of inverting a first DC signal to provide a first AC signal having an adjustable pulse width and transforming the first AC signal into a second DC signal having a magnitude responsive to its pulse width. The method further includes the steps of inverting the second DC signal at a selectable frequency to provide a second AC signal having a magnitude responsive to the magnitude of the second DC signal and providing a third AC signal, having a magnitude and frequency responsive to the magnitude and frequency of the second AC signal, to an induction head.

DETAILED DESCRIPTION OF A PREFERRED EXEMPLARY EMBODIMENT

Figure 1:
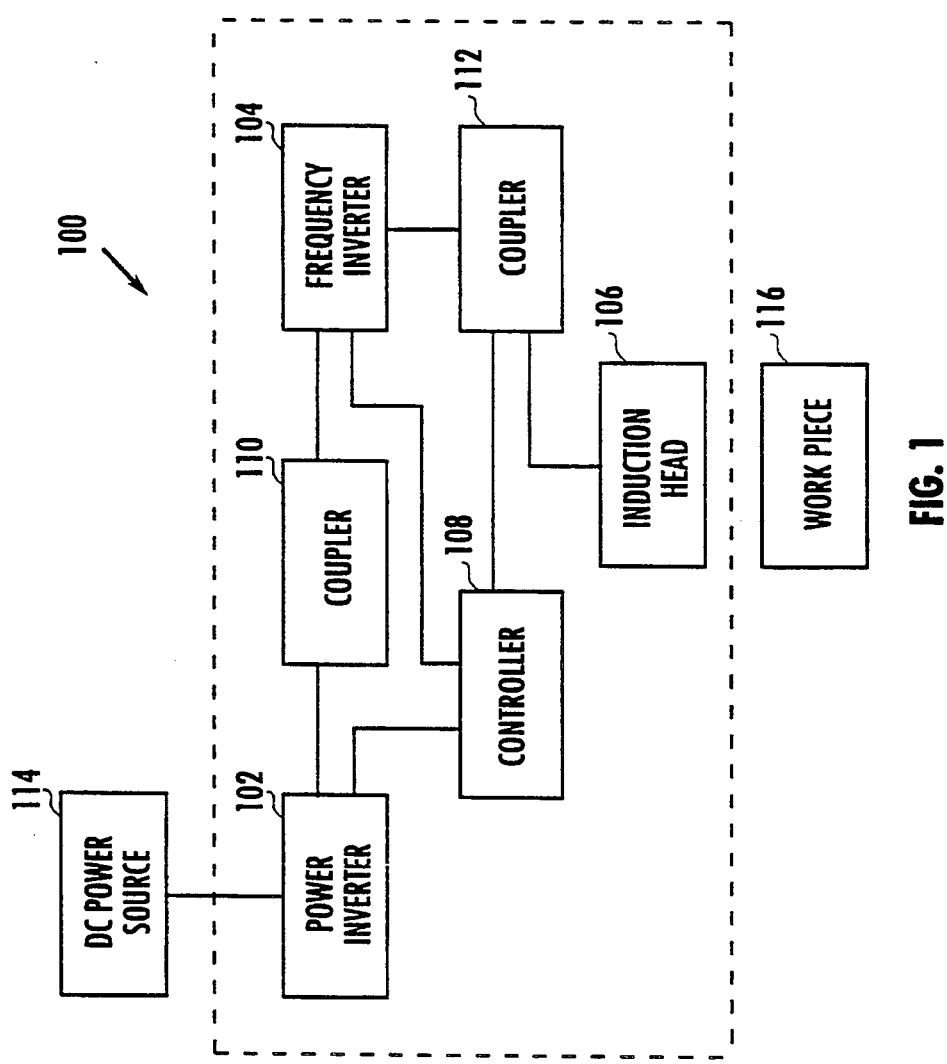
FIG. 1 is a block diagram of an induction heater constructed according to one aspect of the present invention.

Before explaining at least one embodiment of the invention in detail it is to be understood that the invention is not limited in its application to the details of construction and the arrangement of the components set forth in the following description or illustrated in the drawings. The invention is capable of other embodiments or being practiced or carried out in various ways. Also, it is to be understood that the phraseology and terminology employed herein is for the purposes of description and should not be regarded as limiting.

The present invention relates to an induction heater such as one used to cure an adhesive for adhering a piece of metal to another object. The illustrated induction heater is constructed to provide peak power independent of operating frequency and is further capable of utilizing a DC input or an AC input.

Referring to FIG. 1 an induction heater, designated generally as 100, includes a power inverter 102, a frequency inverter 104, an induction head 106, a controller 108, and couplers 110 and 112. Also shown in FIG. 1 is a workpiece 116, which induction heater 100 heats, and a DC power source 114.

In operation, power inverter 102 receives DC power from DC power source 114. Alternatively, the power source may be an AC power source, and a rectifier may be provided, so that power inverter 102 receives a rectified AC power supply. Power inverter 102 then inverts the DC power supply signal, and pulse width modulates the inverted signal (also called phase modulation or control of the inverter signal), to provide an AC signal at a first frequency that is high enough to respond quickly to feedback signals, but not so fast as to cause stress to the inverter components. Coupler 110 then rectifies the AC signal to provide a second DC signal having a magnitude dependent upon the pulse width or phase modulation of the AC signal power inverter 102.

The second DC signal, the output of coupler 110, is applied to frequency inverter 104. Frequency inverter 104 inverts the DC signal at a user-selectable frequency selected to optimize heating. The magnitude of the AC signal is dependent upon the magnitude of the DC input signal, and is thus responsive to the pulse width modulation of power inverter 102. The AC signal is transformed by coupler 112 and is applied to induction head 106.

The AC current through induction head 106 induces current in workpiece 116, thus causing workpiece 116 to become hot at the location near induction head 106. Peak heat intensity produced in workpiece 116 is dependent upon the peak magnetic flux induced in the workpiece. The magnetic flux in turn is responsive to the magnitude of the signal provide by frequency inverter 104, and thus also is responsive to the phase modulation of power inverter 102. Controller 108 is provided to control the pulse width modulation of power inverter 102, and the frequency of operation of frequency inverter 104.

Figure 2:
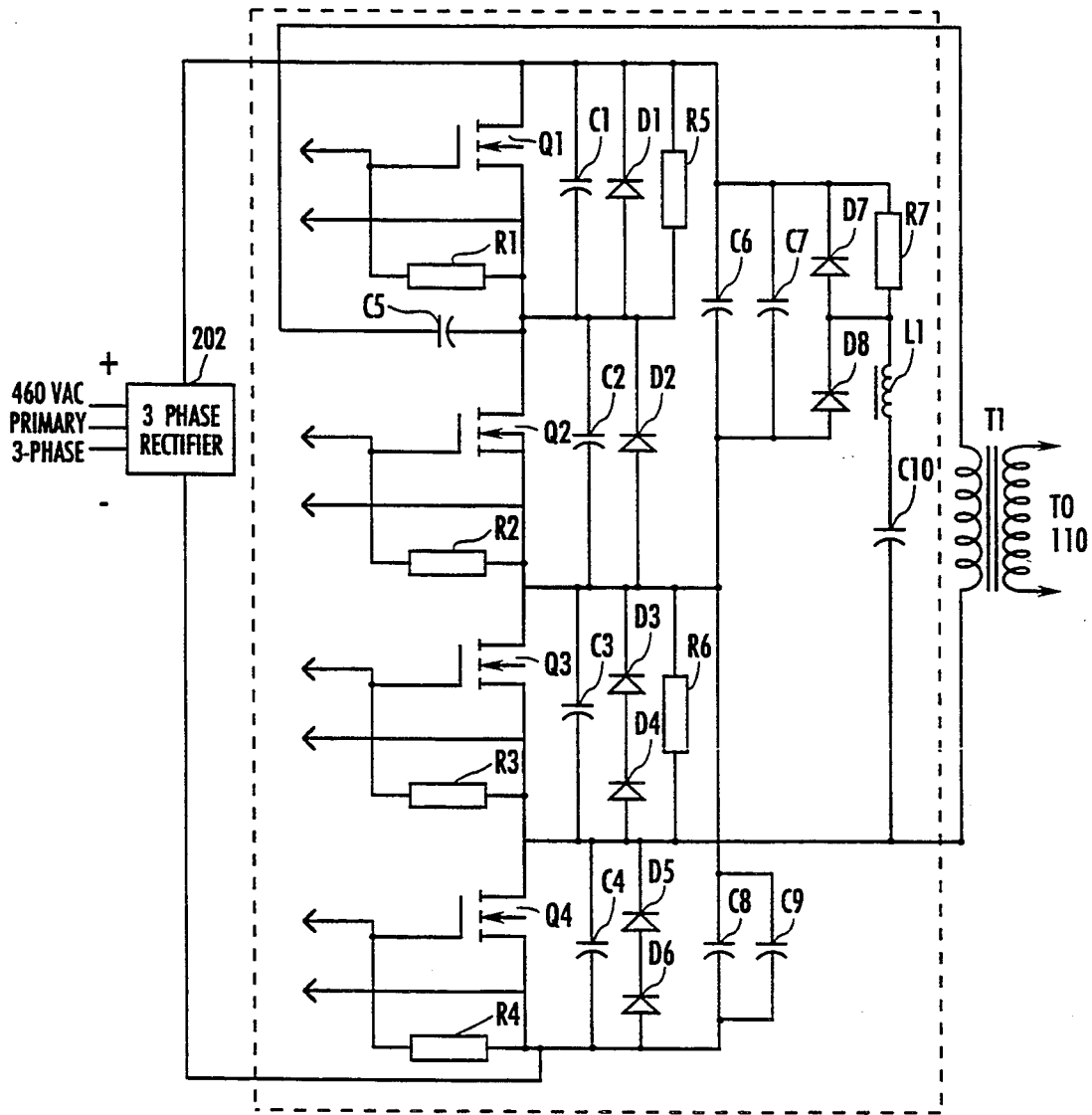
FIG. 2 is a circuit diagram of the power inverter shown in FIG. 1.

Referring now to FIG. 2, power inverter 102 is shown along with a three phase rectifier 202. Power inverter 102 is shown to include a plurality of MOSFETs Q1–Q4, a plurality of capacitors C1–C10, a plurality of diodes D1–D8, a plurality of resistors R1–R7 and an inductor L1. A transformer T1, which is part of coupler 110, is also shown. In operation three phase rectifier 202 preferably provides up to 100 amps at 1200 volts by rectifying a 460 volt, three phase AC signal.

In general there are two mutually exclusive current paths for providing current flow first in one direction through the primary transformer T1 and then in the opposite direction through the primary of transformer T1. The current paths are: first, from the positive output of three phase rectifier 202 through MOSFET Q1, capacitor C5, the primary of transformer T1, MOSFET Q4, and back to the negative output of the rectifier; and, second, from capacitor C5, through MOSFET Q2, MOSFET Q3, the primary of transformer T1, and back to capacitor C5. These paths are selected by turning MOSFETs Q1 and Q4 on and MOSFETs Q2 and Q3 off, or conversely, by turning MOSFETs Q2 and Q3 on and MOSFETs Q1 and Q4 off.

In operation capacitor C5 is charged to about 325 volts, or one half of the 650 volt supply. Thus, when MOSFETs Q1 and Q4 are on, ignoring voltage drops across MOSFETs Q4 and Q1, approximately 325 volts (650 volt supply minus 325 volts across capacitor C5) is applied to the primary of transformer T1, with the upper terminal of the primary being positive with respect to the lower terminal.

When MOSFETs Q2 and Q3 are on and MOSFETs Q1 and Q4 are off, approximately 325 volts is applied across the primary of transformer T1 in the opposite direction. Capacitors C6–C9 are provided to tie the voltage between MOSFETs Q2 and Q3 to 325 volts, or one-half of the rectified input. When MOSFETs Q2 and Q3 are on, the voltage between MOSFET Q2 and capacitor C5 is tied to the voltage at the node common to MOSFETs Q2 and Q3 and capacitors C6–C9, or about 325 volts. The voltage across capacitor C5, which is an 8 microfarad high current polypropylene capacitor, is 325 volts, and due to the large capacitance of capacitor C5, will not change quickly. Thus, the voltage applied to the top of the primary of transformer T1 is zero volts. Also, through MOSFET Q3 and capacitors C6–C9, 325 volts is applied to the bottom of the primary of transformer T1. Thus, turning MOSFETs Q2 and Q3 on causes 325 volts to be applied to transformer T1, but in the reverse direction of the 325 volts applied by turning on MOSFETs Q1 and Q4.

In order to pulse width modulate, or phase control, the signal applied to the primary of transformer T1, MOSFETs Q1 and Q2 are turned on and off at a constant frequency, preferably about 50 kilohertz. MOSFETs Q1 and Q2 are 180 degrees out of phase, and each has a duty cycle of 50%. MOSFETs Q3 and Q4 also have duty cycles of 50% and are 180 degrees out of phase from one another. Also, MOSFETs Q3 and Q4 are slaved to MOSFETs Q2 and Q1, respectively, in that they may be turned on from zero to 180 degrees out of phase with respect to the respective time MOSFETs Q1 and Q2 are on. Because a pulse is applied to the primary of transformer T1 only when both MOSFETs Q1 and Q4 are on, or when both MOSFETs Q2 and Q3 are on, the phase of MOSFET Q4 relative to MOSFET Q1, and the phase of MOSFET Q3 relative to MOSFET Q2, determines the pulse width of the signal applied to the primary of transformer T1. Because MOSFETs Q3 and Q4 are 180 degrees out of phase of one another, they are each out of phase with respect to MOSFETs Q2 and Q1, respectively, by an identical amount.

For example, when MOSFET Q3 is zero degrees out of phase with respect to (in phase with) MOSFET Q2, MOSFET Q3 will be on the entire half cycle that MOSFET Q2 is on, and a pulse for the full half cycle will be applied to the primary of transformer T1. Also, if MOSFET Q3 is in phase with MOSFET Q2, then MOSFET Q4 will be in phase with MOSFET Q1, and a pulse for the full other half cycle will also be provided to the primary of transformer T1. Conversely, when MOSFET Q3 is 180 degrees out of phase with respect to MOSFET Q2, MOSFET Q3 will be off the entire half cycle that MOSFET Q2 is on, and no pulse will be applied to the primary of transformer T1. Again, MOSFET Q4 will also be 180 degrees out of phase with respect to MOSFET Q1, and no pulse will be provided on the other half cycle. In general, because MOSFET Q3 is out of phase with respect to MOSFET Q2 by the same amount that MOSFET Q4 is out of phase with respect to MOSFET Q1, in steady state operation the opposite polarity pulses will have the same width. Thus, the width of the 325 volt pulses applied to the primary of transformer T1 is dependent upon the phase of MOSFET Q4 with respect to MOSFET Q1, and the phase of MOSFET Q3 with respect to MOSFET Q2.

Accordingly, to control the total current output of power inverter 102, controller 108, which may include a conventional pulse width modulator, applies signals to the gates of MOSFETs Q1–Q4 and controls the phase of MOSFETs Q3 and Q4 with respect to MOSFETs Q2 and Q1. Alternatively, controller 108 may include a plurality of timers such as a CMOS 4098 dual timer, available from Harris Semiconductor, and a flip-flop, to provide the control of MOSFETS Q1 and Q2. To provide the control of MOSFETS Q3 and Q4, which are slaved to Q2 and Q1, a comparator may be used, having its output connected to a flip-flop and having as inputs a ramp generator and a signal having a magnitude dependent on the desired phase difference between MOSFETS Q1/Q2, and Q4/Q3. Thus, a pulse may be narrow or wide, even though in steady state operation all MOSFETs have a 50% duty cycle, to help insure that high heat build up does not occur in MOSFETs Q1–Q4, to protect the components. It may be desirable to provide a deadband, wherein, for example, the turning on of Q1 or Q3, is delayed slightly from the turning off of Q2 or Q4, respectively, so that Q2 or Q4 will be completely off before Q1 or Q3 is on.

Capacitors C1–C4 are small polypropylene snubbing capacitors and diodes D1–D6 and resistors R5 and R6 are provided to protect MOSFETs Q1–Q4. Capacitors C6 and C8 are large electrolytic capacitors, typically 1700 microfarads and split the voltage provided by three phase rectifier 202 to one-half the supply voltage at the node common to MOSFETs Q2 and Q3. Capacitors C7 and C9 are 8 microfarad high current polypropylene capacitors, provided to smooth the voltage seen by the node common to MOSFETs Q2 and Q3. Diodes D7 and D8 and resistor R7 and inductor L1, along with capacitor C10 are provided to prevent unbalancing of the node common to MOSFETs Q2 and Q3. Specifically, when capacitors C6 and C7 have a voltage across them other than that of capacitors C8 and C9, inductor L1 acts as a spillover inductor and causes the voltage across capacitors C6 and C7 to become equal to that across capacitors C8 and C9. Resistors R1–R4 protect the gate of MOSFETs Q1–Q4.

Figure 3:
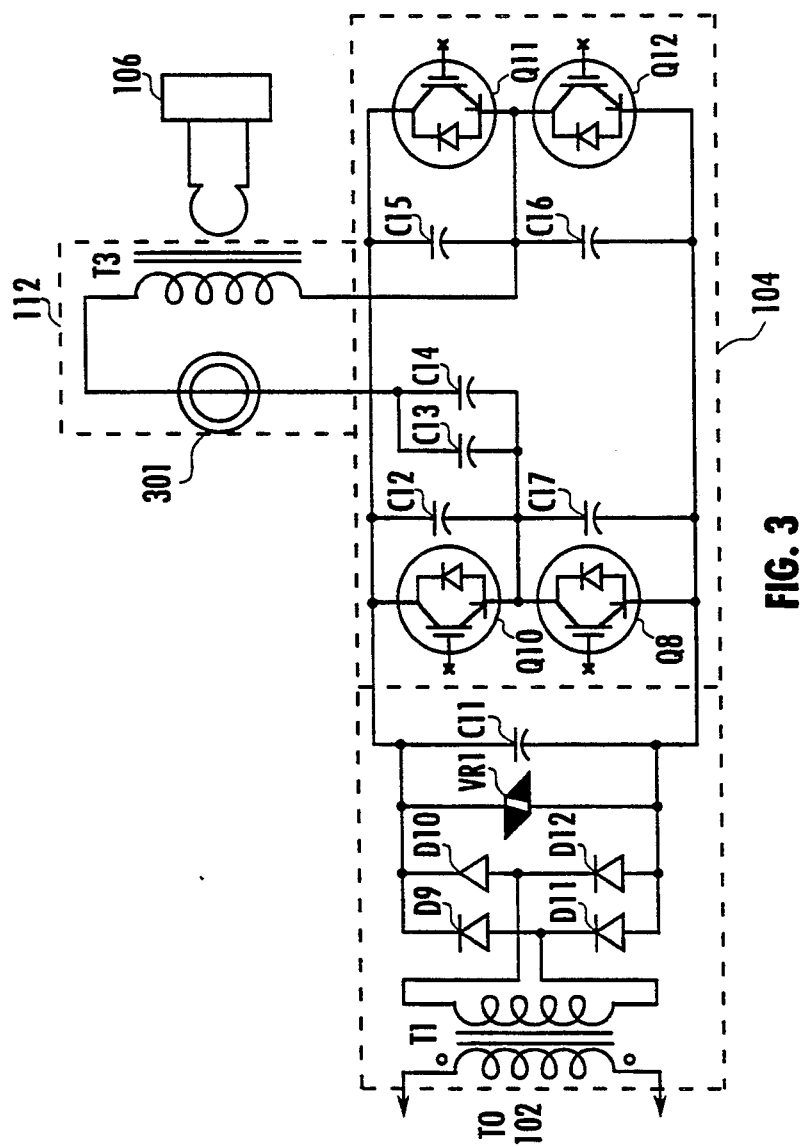
FIG. 3 is a circuit diagram of the frequency inverter shown in FIG. 1.

Referring now to FIG. 3 coupler 110, frequency inverter 104, coupler 112 and induction head 106 are shown. Coupler 110 includes transformer T1, a plurality of diodes D9–D12, a voltage regulator VR1, and a capacitor C11.

The primary of transformer T1 is connected to the output of power inverter 102. As described above, the primary of transformer T1 receives a pulse width modulated AC signal at a desired frequency, exemplified herein to be about 50 Khz. The width of the pulses is determined by phase controller 108 as described above. The secondary of transformer T1 is connected to a diode bridge comprised of diodes D9–D12, which rectifies the AC signal. The rectified signal is applied to capacitor C11 causing a voltage across it. Voltage regulator VR1 is provided to ensure that the voltage across capacitor C11 is not greater than a predetermined limit, selected to protect the components of the inverter. The voltage across capacitor C11 is directly responsive to the total current induced in the secondary of transformer T1, which is responsive to the width of the pulses generated by power inverter 102. The DC voltage across capacitor C11 is provided as the DC input to frequency inverter 104.

Frequency inverter 104 may be a conventional inverter operable at a user adjustable frequency of, e.g., between 10 kHz and 1 MHz, but preferably between 25 kHz and 50 kHz. The frequency range may be higher or lower, depending on the required use of the induction heater. Accordingly, frequency inverter 104 may include transistors Q10–Q13 and capacitors C12–C17. Transistors Q10 and Q12 are turned on and off in unison and transistors Q11 and Q13 are turned on and off in unison. Moreover, whenever transistors Q10 and Q12 are on transistors Q11 and Q13 will be off. It may be necessary to provide a dead band wherein, before turning on one pair of transistors, the other pair is allowed to turn off. Controller 108 provides the appropriate on and off signals to the gates of transistors Q10–Q13. Capacitors C12 and C15–C17 are provided to eliminate switching losses when transistors Q10–Q13 are switched off. Capacitors C13 and C14 are provided to block DC current through an output transformer T3, to prevent saturation of transformer T3.

The output of frequency inverter 104 is provided to coupler 112. Coupler 112 includes a current feedback device 301, which is a ferrite toroidal core with a sixty turn secondary and a single turn primary. The single turn primary is connected to the primary of transformer T3. The output of current feedback device 301 is provided to controller 108 which adjusts the pulse width of power inverter 102 in a conventional manner. In addition to the current feedback, a voltage feedback may be provided to controller 108. Controller 108 may then determine the power (voltage multiplied by current) delivered to induction head 106. Controller 108 may also determine the heat lost in the induction head 106 due to the resistance of the induction head, which will be the current squared, multiplied by the resistance of induction head 106. The difference between the power delivered and the power lost in the induction head is equal to the power delivered to workpiece 116. The multiplication may be carried out using known multiplier chips such as an MPY634 KP chip available from Burr Brown, and the subtraction may be carried out with an op amp. The output of frequency inverter 104 is provided through a primary winding on transformer T3, which may preferably be a coaxial transformer, and induces a current in a secondary winding of transformer T3 which is preferably a two turn loop applied to induction head 106. Accordingly, as frequency inverter 104 drives current through the primary of transformer T3 at the user selectable frequency, a current of the same frequency is induced in induction head 106, thereby heating workpiece 116.

Other modifications may be made in the design and arrangement of the elements discussed herein without departing from the spirit and scope of the invention, as expressed in the appended claims.

I claim:

1. An induction heater comprising:
   a first inverter having a first inverter output;
   a variable frequency output inverter having a variable frequency inverter input;
   a first coupling circuit in electrical communication between said first inverter output and said variable frequency output inverter input, wherein said variable frequency output inverter is cascaded with said inverter;
   an induction head; and
   a second coupling circuit in electrical communication between said variable frequency output inverter and said induction head.

2. The induction heater of claim 1 wherein said first inverter is a phase modulated inverter.

3. The induction heater of claim 1 wherein said induction heater comprises control means for controlling said first inverter and further wherein said control means includes feedback means for providing control signals to said control means in response to the power output of said induction head.

4. The induction heater of claim 3 wherein said feedback means includes means to provide a signal indicative of the magnitude of the current provided to said second coupling circuit.

5. The induction heater of claim 3 wherein said feedback means includes means to provide a signal indicative of the magnitude of the power provided to said second coupling circuit.

6. The induction heater of claim 1 further including a frequency controller in electrical communication with said variable frequency output inverter.

7. The induction heater of claim 6 wherein said variable frequency output inverter is operable in the range of from about 10 kHz to about 1 MHz.

8. The induction heater of claim 1 further including a DC power source coupled to said first inverter.

9. The induction heater of claim 8 wherein said DC power source includes an AC power source and a rectifier.

10. The induction heater of claim 8 wherein said power source is coupled to no more than one inverter.

11. The induction heater of claim 1 wherein said first coupling circuit includes a transformer.

12. The induction heater of claim 11 wherein said first coupling circuit includes a rectifier.

13. The induction heater of claim 1 wherein said first inverter provides a first AC signal and said second inverter provides a second AC signal, and said second coupling circuit includes a coaxial transformer which provides a third AC signal.

14. The induction heater of claim 1 wherein said induction head is a two turn coil.

15. The induction heater of claim 1 wherein said first inverter is a power inverter.

16. The induction heater of claim 1 wherein said first inverter is a pulse width modulated inverter.

17. An induction heater comprising:
    a phase modulated inverter operable at a first frequency;
    first coupling means, having an AC input receiving a first output signal from said phase modulated inverter, for providing a DC output signal having a magnitude responsive to the phase modulation of said phase modulated inverter;
    an adjustable frequency inverter receiving said DC output signal, wherein said adjustable frequency inverter provides a second output signal having a magnitude responsive to the magnitude of said DC output signal;
    an induction head for coupling energy to a workpiece in response to an applied electrical signal;
    second coupling means in electrical communication between said adjustable frequency inverter and said induction head; and
    control means, in electrical communication with said phase modulated inverter, for providing a feedback signal indicative of the power output of said induction head and for controlling the phase modulation of said phase modulated inverter in response to said feedback signal.

18. The induction heater of claim 17 wherein said second coupling means includes a transformer having a primary winding in electrical communication with said second inverter and a secondary winding in electrical communication with said induction head.

19. The induction heater of claim 17 wherein said control means is further in electrical communication with said second inverter, and further includes means for selecting the frequency of operation of said adjustable frequency inverter.

20. An induction heater comprising:
    first inverter means for receiving a first DC signal and providing a first modulated AC signal;
    second inverter means for receiving a second DC signal and providing a second AC signal at an adjustable frequency, said second AC signal having a magnitude responsive to the magnitude of said second DC signal;
    first coupling means, in electrical communication between said first inverter means and said second inverter means, for receiving said first AC signal and converting said first AC signal to said second DC signal, said second DC signal having a magnitude responsive to the modulation of said first AC signal;
    an induction head for coupling energy; and
    second coupling means, in electrical communication between said second inverter means and said induction head, for receiving said second AC signal and providing a third AC signal to said induction head, said third AC signal having a magnitude responsive to a magnitude of said second AC signal.

21. The induction heater of claim 20 further including control means, in electrical communication with said first inverter means, for controlling the modulation of said first AC signal.

22. The induction heater of claim 21 wherein said first inverter means includes a plurality of switches and wherein said control means includes phase modulation means for modulating the phase at which said plurality of switches are turned on and off.

23. The induction heater of claim 22 wherein said control means further includes feedback means, for providing a feedback signal indicative of the power output of said induction head.

24. The induction heater of claim 22 wherein said control means further includes feedback means, for providing a feedback signal indicative of the non-coupling losses in said induction head.

25. The induction heater of claim 21 wherein said first inverter means includes means for providing a frequency modulated AC signal.

26. A method of induction heating comprising the steps of:
 inverting a first DC signal to provide a first AC signal having an adjustable pulse width;
 transforming the first AC signal into a second DC signal having a magnitude responsive to the pulse width of the first AC signal;
 inverting the second DC signal at a selectable frequency to provide a second AC signal having a magnitude responsive to the magnitude of the second DC signal;
 providing a third AC signal, having a magnitude and frequency responsive to the magnitude and frequency of the second AC signal, to an induction head for coupling energy.

27. The method of claim 26 further including the steps of:
 providing a feedback signal indicative of the power output of the induction head; and
 adjusting the pulse width of the first AC signal in response to the feedback signal.

28. The method of claim 27 wherein the step of inverting the first DC signal includes the step of phase modulation to adjust the pulse width of the first AC signal.

29. The method of claim 26 wherein the frequency of said second AC signal is the same as the frequency of said third AC signal.

30. The method of claim 26 wherein the frequency of said second AC signal is selected in response to feedback.

31. An induction heater comprising:
 first inverter means for receiving a first DC signal and providing a first modulated AC signal;
 second inverter means for receiving a second DC signal and providing a second AC signal at an adjustable frequency, said second AC signal having a magnitude responsive to the magnitude of said second DC signal;
 first coupling means, in electrical communication between said first inverter means and said second inverter means, for receiving said first AC signal and converting said first AC signal to said second DC signal, said second DC signal having a magnitude responsive to the modulation of said first AC signal; and
 an induction head coupled to the second inverter means.

32. The induction heater of claim 31 wherein said induction head includes means for coupling energy to a workpiece, said energy having a magnitude responsive to a magnitude of said second AC signal.

* * * * *